(12) United States Patent
Bickford et al.

(10) Patent No.: US 6,928,875 B2
(45) Date of Patent: Aug. 16, 2005

(54) DUAL MICROWAVE CAVITY ACCELEROMETER

(75) Inventors: James A. Bickford, Winchester, MA (US); Marc S. Weinberg, Needham, MA (US); Anthony Petrovich, Tewksbury, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 37 days.

(21) Appl. No.: 10/341,666

(22) Filed: Jan. 14, 2003

(65) Prior Publication Data

US 2005/0115319 A1   Jun. 2, 2005

Related U.S. Application Data

(60) Provisional application No. 60/369,062, filed on Apr. 1, 2002.

(51) Int. Cl.[7] .............................................. G01P 15/08
(52) U.S. Cl. .............................. 73/514.31; 73/514.16; 73/497
(58) Field of Search ........................ 73/514.16, 514.31, 73/497; 324/633, 636, 635

(56) References Cited

U.S. PATENT DOCUMENTS

| | | | | |
|---|---|---|---|---|
| 3,581,190 A | * | 5/1971 | Brown | 324/318 |
| 5,261,278 A | * | 11/1993 | Kain | 73/514.24 |
| 5,292,569 A | * | 3/1994 | Barry et al. | 428/66.6 |
| 5,351,541 A | * | 10/1994 | Petrovich et al. | 73/514.16 |
| 5,623,098 A | * | 4/1997 | Castleman et al. | 73/497 |
| 6,481,286 B1 | * | 11/2002 | Bernstein et al. | 73/514.31 |

* cited by examiner

*Primary Examiner*—Helen Kwok
(74) *Attorney, Agent, or Firm*—Iandiorio & Teska

(57) ABSTRACT

A system and method for compensating for gradients in a dual cavity device such as but not limited to an accelerometer. A first source drives a first cavity at least two different modes, at least one mode varying with changes in cavity length. A second source drives a second cavity at least two different modes, at least one mode varying with changes in cavity length. A processor determines changes in cavity length as a function of both modes in both cavities to compensate for non-uniform behavior between the cavities.

23 Claims, 3 Drawing Sheets

DUAL MICROWAVE CAVITY ACCELEROMETER

RELATED APPLICATIONS

This application claims priority of U.S. Provisional Application Ser. No. 60/369,062, filed Apr. 1, 2002.

This invention was made with U.S. Government support under Contract No. HP10786M85 awarded by the U.S. Air Force. The Government may have certain rights in the subject invention.

FIELD OF THE INVENTION

This invention relates to a system for compensating for gradients in a dual cavity device and, in one embodiment, a more accurate dual microwave cavity accelerometer.

BACKGROUND OF THE INVENTION

Missile guidance systems may employ a flexured mass accelerometer wherein a microwave cavity changes in length via movement of a proof mass when subject to acceleration. An oscillator radiates radio frequency (RF) energy in the cavity producing a standing wave known as a transverse electric or transverse magnetic resonance. The frequency of this resonance is a function of the length of the cavity. When subjected to acceleration, the proof mass moves changing the length of the cavity and also the frequency of the transverse electric or transverse magnetic resonance. A phase detector can then be used to detect the new frequency and a microprocessor is employed to calculate acceleration based on the frequency change of the transverse electric or transverse magnetic resonance.

One problem, however, is that the frequency of the resonance is also a function of the diameter of the cavity which can vary based on temperature.

In response, those skilled in the art have proposed employing temperature sensors to provide a correction factor or employing thermal control techniques. The use of temperature sensors alone is not often practical for very accurate systems because traditional temperature measurement devices such as thermistors are not sensitive or accurate enough in an operational environment to provide sufficient data for temperature compensation or control. Also, other error reduction techniques are often impractical due to the high material costs and the manufacturing limitations associated with low thermal expansion materials.

Those skilled in the art have also devised dual cavity systems wherein movement of the proof mass increases the length of one cavity and decreases the length of the other cavity. See U.S. Pat. No. 5,351,541 incorporated herein by this reference. An electromagnetic standing wave is formed in both cavities and when, the proof mass moves due to acceleration forces, one standing wave frequency increases while the other standing wave frequency decreases. Both frequency changes are indicative of both acceleration and temperature changes affecting the radius of both cavities. But, the effect of temperature on the cavity dimensions can be nullified using common mode error reduction techniques.

Such a dual cavity system is only accurate, however, if both cavities experience the same temperature effects. If both cavities respond equally, any temperature effects are eliminated during the frequency subtraction process. Unfortunately, due to slight variations in manufacturing and in the flexure stiffness of the proof mass, common mode error reduction does not completely remove thermal errors. In addition, certain errors, such as temperature gradients along the input axis, cannot be corrected for because the responses of the two cavities are intrinsically different.

Since one cavity may experience a temperature variation different than the temperature variation experienced by the other cavity, the system described in U.S. Pat. No. 5,623,098, also incorporated herein by this reference, discloses a single cavity design with two standing waves excited in the cavity. One oscillator produces a standing electromagnetic wave in the cavity (as in the prior art) which changes in frequency as a function of cavity length and as a function of cavity diameter. The other oscillator produces a specific transverse magnetic resonance in the same cavity which changes in frequency only as a function of cavity diameter. The frequency at which a transverse magnetic resonance is produced is known to change with cross-sectional area changes of the cavity, but for a certain subset of these resonances, not with cavity length. Thus, frequency changes of the specific transverse magnetic resonance in the cavity can be used to compensate for temperature induced errors.

The problem with this design, however, is that it erroneously assumes there are no temperature gradients in the single cavity. And, although the '098 patent teaches away from a dual cavity design, single cavity design will not work well in high accuracy applications because of the stringent requirements placed on the system clock that must be radiation hard. With two cavities, when the resonant frequencies are chosen appropriately, the system clock must be stable to one ppm while with only one cavity the clock must be stable to the order of one ppb.

SUMMARY OF THE INVENTION

It is therefore an object of this invention to provide an accelerometer which compensates for non-uniform temperature variations and other non-uniform behaviors.

It is a further object of this invention to provide such an accelerometer which is more accurate.

It is a further object of this invention to provide such an accelerometer which can be manufactured using conventional materials.

It is a further object of this invention to provide such an accelerometer which does not require stringent requirements for the system clock.

It is a further object of this invention to provide such an accelerometer which is rugged, accurate, and reliable.

It is a further object of this invention to provide a system for compensating for gradients, (e.g., temperature gradients), in a dual cavity device (e.g., an accelerometer).

The invention results from the realization that the limitations associated with single cavity systems can be overcome in a dual cavity system by driving both cavities at least two different modes and detecting changes in cavity length as a function of both modes in both cavities to compensate not only for temperature changes which affect both cavities in the same way, but also to compensate for temperature and other gradients which do not affect both cavities equally.

In one embodiment, this invention features an accelerometer comprising a first microwave cavity, a second microwave cavity, and a proof mass disposed between the cavities which, in response to acceleration, increases the length of one cavity and decreases the length of the other cavity. A first source introduces RF energy into the first cavity to produce at least first and second standing waves at first and second resonant frequencies at least one of which changes in frequency with changes in cavity length. The source also produces first and second outputs indicative of the first and second frequencies. A second source introduces RF energy into the second cavity to produce at least third and fourth standing waves at third and fourth resonant frequencies at least one of which changes in frequency with changes in cavity length. The source produces third and fourth outputs indicative of the third and fourth frequencies. A processor or other means is responsive to the first, second, third, and fourth outputs for determining acceleration as a function of any change in the first, second, third, and fourth frequencies to thereby compensate for non-uniform behavior between the two microwave cavities.

Typically, the first and second sources are coupled to the first and second microwave cavities by coaxial couplers. In addition, further included may be one or more sensors responsive to other parameters which effect the microwave cavities and providing an output to the processor. The processor is then further configured to determine acceleration also as a function of that output. In addition, one or more sensors may be responsive to one or both sources to provide outputs to the processor which is further configured to determine acceleration also as a function of those outputs.

In one example, each source includes a voltage controlled signal source for each resonant frequency and a phase detection circuit for each frequency to lock a respective voltage controlled signal source and to produce the outputs to the means for determining acceleration. Each source may further include a signal combiner responsive to all of the voltage controlled signal sources for adding the signals of each source and providing those signals to the cavity. Typically, an amplifier is connected between each phase detector circuit and each voltage controlled signal source and a filter is disposed between each phase detector circuit and the cavity for separating the frequencies.

In another example, each source further includes a modulator responsive to each voltage controlled signal source to phase modulate the signal produced by each voltage controlled signal source. An amplitude detector is disposed between the phase detector circuit and the cavity and each source further includes an intermediate frequency filter disposed between each amplitude detector and each phase detector circuit.

A system for compensating for gradients in a dual cavity device in accordance with this invention features a first source for driving a first cavity at least two different modes, at least one mode varying with changes in cavity length, a second source for driving a second cavity at least two different modes, at least one mode varying with changes in cavity length, and means for determining changes in cavity length as a function of both modes in both cavities to compensate for non-uniform behavior between the cavities.

The change in the first cavity length typically produces a frequency change at a first mode $\Delta\omega_{a1}$, the change in the first cavity length produces a frequency change at a second mode $\Delta\omega_{a2}$, the change in the second cavity length produces a frequency change at a first mode of $\Delta\omega_{b1}$, and the change in the second cavity length produces a frequency change at a second mode of $\Delta\omega_{b2}$. The processor means calculates acceleration $\hat{g} = \hat{S}_{a1}\Delta\omega_{a1} + \hat{S}_{a2}\Delta\omega_{a2} + \hat{S}_{b1}\Delta\omega_{b1} + \hat{S}_{b2}\Delta\omega_{b2}$, where $\hat{S}_{a1}$, $\hat{S}_{a2}$, $S_{b1}$ and $\hat{S}_{b2}$ are stored as constants. There may also be one or more other sensors (e.g., temperature and/or pressure sensors) responsive to the first and/or second sources and having an output D and the processor then calculates acceleration $\hat{g} = \hat{S}_{a1}\Delta\omega_{a1} + \hat{S}_{a2}\Delta\omega_{a2} + \hat{S}_{b1}\Delta\omega_{b1} + \hat{S}_{b2}\Delta\omega_{b2} + S_D D$. A typical accelerometer in accordance with this invention features a first microwave cavity, a second microwave cavity, and a proof mass between the cavities which, in response to acceleration, increases the length of one cavity while decreasing the length of the other cavity. A first source introduces RF energy into the first cavity to produce at least first and second standing waves at first and second resonant frequencies $\omega_{a1}$ and $\omega_{a2}$ at least one of which changes in frequency with changes in cavity length. The source also produces first and second outputs indicative of any changes of the first and second frequencies $\Delta\omega_{a1}$ and $\Delta\omega_{a2}$. A second source introduces RF energy into the second cavity to produce third and fourth standing waves at third and fourth resonant frequencies $\omega_{b1}$, and $\omega_{b2}$ at least one of which changes in frequency with changes in cavity length. The second source also produces third and fourth outputs indicative of any change in the third and fourth frequencies $\Delta\omega_{b1}$ and $\Delta\omega_{b2}$. A processor then determines acceleration g as a function of $\Delta\omega_{a1}$, $\Delta\omega_{a2}$, $\Delta\omega_{b1}$, and $\Delta\omega_{b2}$.

One method of determining acceleration in accordance with this invention includes introducing RF energy into a first cavity to produce at least first and second standing waves at first and second resonant frequencies at least one of which changes in frequency with changes in cavity length, introducing RF energy into a second cavity to produce at least third and fourth standing waves at third and fourth resonant frequencies at least one of which changes in frequency with changes in cavity length, and determining acceleration as a function of any change in the first, second, third, and fourth frequencies to compensate for non-uniform behavior between the two microwave cavities.

In accelerometers and even with respect to devices other than accelerometers, this invention features a method for compensating for gradients in a dual cavity device wherein one cavity is driven at least two different modes, at least one mode varying with changes in cavity length, and the other cavity is driven at least two different modes, at least one mode varying with changes in cavity length. Changes in cavity length are determined as a function of both modes in both cavities to compensate for non-uniform behavior between the cavities.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
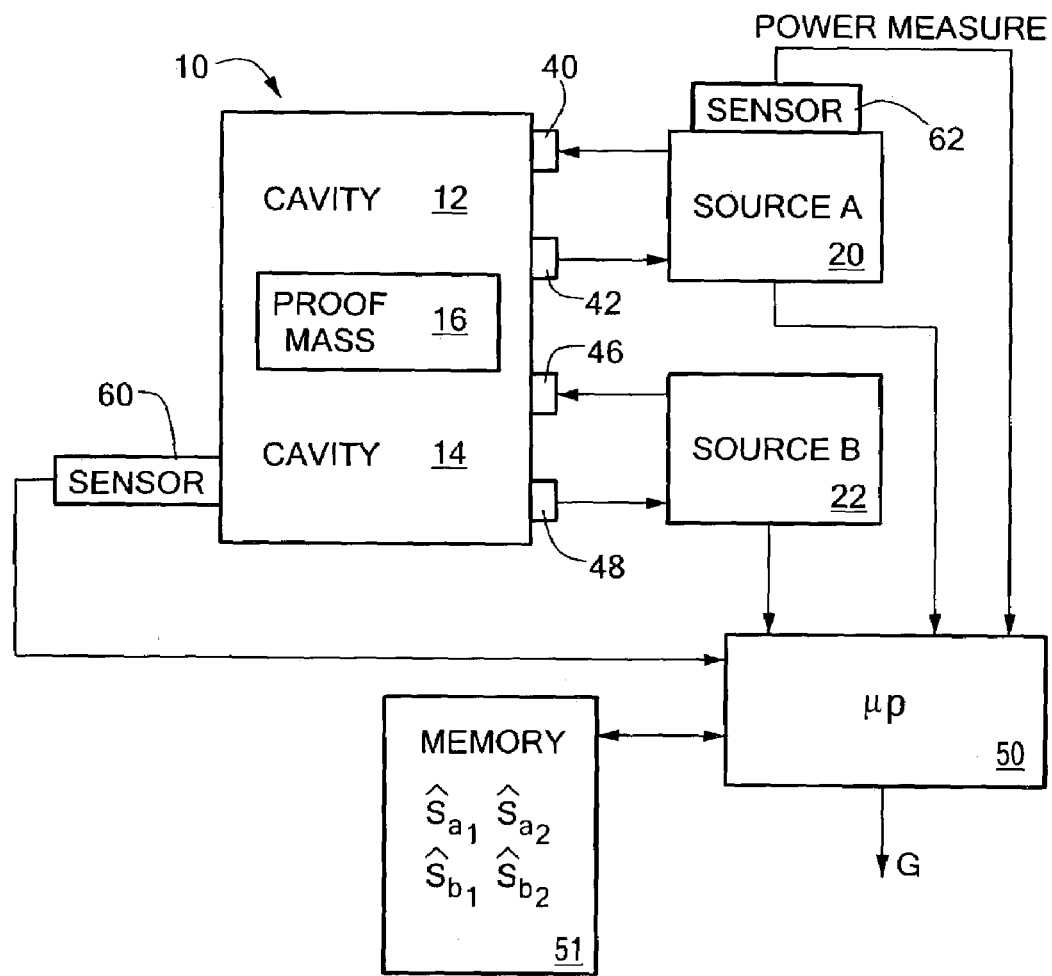
FIG. 1 is block diagram showing the primary components associated with the accelerometer embodiment of the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

FIG. 1 shows the primary components associated with one specific embodiment of the subject invention wherein dual cavity device 10 is an accelerometer with first microwave cavity 12, second microwave cavity 14, and proof mass 16 therebetween. Proof mass 16, in response to acceleration forces, increases the length of cavity 14 while decreasing the length of cavity 12, or vice versa. Suitable dual cavity designs include those shown in the '541 and '098 patents and thus the details of the same need not be repeated here.

As known in the art, if a standing wave known as an electromagnetic resonance is established in cavity 12, the frequency at which such a standing wave is produced depends on the length and cross-sectional area of cavity 12. Thus, when proof mass 16 moves and decreases the length of cavity 12, the frequency of the established electromagnetic resonance changes. In this way, acceleration can be calculated. The problem, however, is that temperature changes can affect cavity 12 and thus also affect the frequency of the electromagnetic resonance as well.

So, in the prior art, common mode error correction was provided via the addition of cavity 14 also with a standing wave therein. Unfortunately, as delineated in the Background section above, common mode error correction does not correct for temperature gradients affecting cavity 12 differently than cavity 14 or correct for temperature gradients within any one cavity.

In the '098 patent, only one cavity is used but both a transverse electric resonance and a specific transverse magnetic resonance is established in the single cavity. The specific transverse magnetic resonance chosen only changes in frequency due to changes in the cross-sectional dimension of the cavity and not in response to changes in cavity length due to acceleration as the proof mass moves. Thus, changes in frequency of the specific transverse magnetic resonance chosen can be used to compensate for temperature induced errors. Unfortunately, this technique fails to take into account temperature gradients or other changes in the single cavity and, moreover, requires an extremely stable system clock as delineated in the Background section above.

In the subject invention, in contrast, source 20 introduces RF energy into cavity 12 to produce at least first and second standing waves at first and second resonant frequencies and source 22 similarly introduces RF energy into cavity 14 to produce at least third and fourth standing waves at third and fourth resonant frequencies. Typically, however, there are actually more than two modes in each cavity as discussed in reference to the embodiments of FIGS. 2–3 below. Also, the first resonant frequency in cavity 12 could be the same as the third resonant frequency in cavity 14 and the second resonant frequency in cavity 12 could be the same as the fourth resonant frequency in cavity 14.

Indeed, the resonant frequencies chosen may all produce transverse electric resonant peaks or modes (TE) which change in frequency due to cavity length and cavity cross-sectional area. Sources 20 and 22 may alternatively produce all transverse magnetic resonances ($TM_{p>0}$) which change in frequency due to cavity length and also due to cavity cross-sectional area. More typically, however, in each cavity, a TE or $TM_{p>0}$ resonance is produced as is a resonance chosen from the subset of the magnetic resonances ($TM_{p=0}$) which change in frequency with cross-sectional area changes of the cavity but not with cavity length changes where p represents the mode shape number of the standing wave. Thus, source 20 may produce one or more TE resonances and one or more $TM_{p=0}$ resonances in cavity 12, one or more TE resonances and one or more $TM_{p>0}$ resonances or one or more TE resonances, one or more $TM_{p>0}$ resonances, and one or more $TM_{p=0}$ resonances. Source 22 may be configured the same as source 20 or differently provided at least one TE or one $TM_{p>0}$ resonance is produced in each cavity. That is, no cavity should be subjected to only $TM_{p=0}$ resonances because those resonances only change in frequency due to cross-sectional area changes of the cavity. Thus, source 20 may produce a combination of TE and/or TM resonant modes where at least one provides sensitivity to vertical (IA) motion of the proof-mass.

Typically, source 20 is coupled to cavity 12 via input coaxial coupler 40. In the case where source 20 also includes a detector, as is typical, source 20 is also coupled to cavity 12 via output coaxial coupler 42. Source 22 is coupled to cavity 14 via input coaxial coupler 46 and output coaxial coupler 48. The output of source 20 produces a signal indicative of the first and second resonant frequencies in cavity 12 to some means for determining acceleration such as the microprocessor 50 shown in FIG. 1. Source 22 similarly provides an output indicative of the third and fourth resonant frequencies in cavity 14 to microprocessor 50.

Processor 50 then determines acceleration as a function of any change in the first, second, third, and fourth frequencies (again, typically there are more than two frequencies produced in each cavity) to uniquely compensate for non-uniform behavior between microwave cavity 12 and microwave cavity 14, for example temperature gradients which affect the cross-sectional area of cavity 12 differently than the cross-sectional area of cavity 14 and/or temperature gradients which affect different portions of any one cavity in a non-uniform manner.

In addition, sensors such as sensor 60 and sensor 62 may provide output signals to processor 50. In one example, sensor 60 is a thermistor which senses the temperature of cavity 14 and sensor 62 is configured to sense the drift of source 20. Similar sensors may be used in connection with cavity 12 and source 22. Thus, in addition to the compensation provided by the multiple modes in each cavity which account for changes in the microwave cavity sizes due to thermal variations, any error inducing effects from electronic drift due to temperature and/or other error sources can be compensated for. Other external disturbances and parameters (system temperature, power consumption and the like) can also be measured and accounted for as discussed below. In this way, processor 50 is thus programmed to calculate acceleration more accurately than in the prior art.

Figure 2:
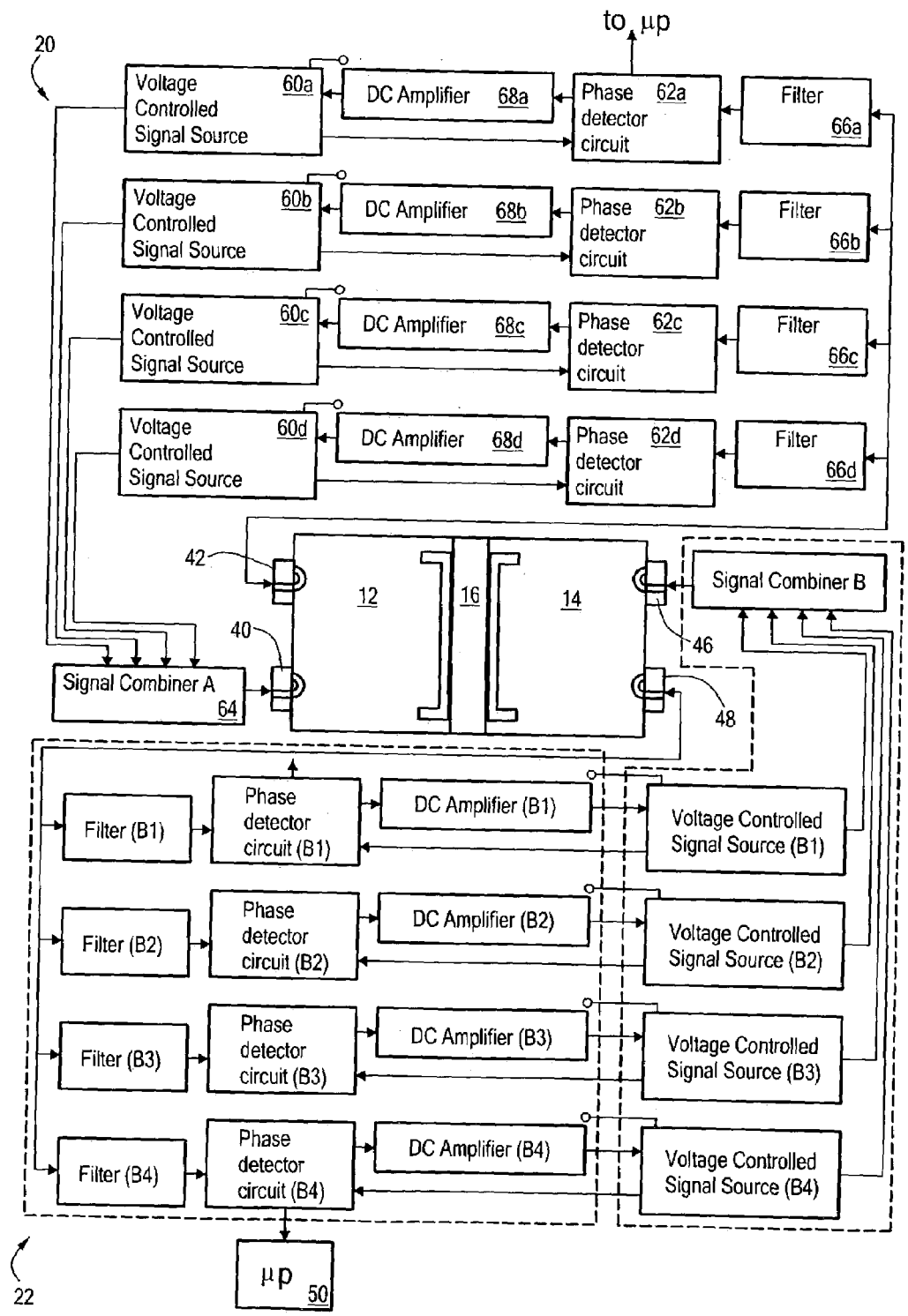
FIG. 2 is a block diagram showing the primary components associated with one embodiment of the two sources of RF energy depicted in FIG. 1.

In one embodiment, source 20 includes voltage controlled signal sources 60a–60d, FIG. 2, one for each of four resonant frequencies to be established in microwave cavity 12 and phase detector circuits 62a–62d which lock their respective voltage controlled signal sources and correspondingly produce outputs indicative of each frequency to processor 50. Additional sources can be added or subtracted to match the number of modes that are desired. Signal combiner 64 adds the group of controlled voltage source signals and provides them to cavity 12 via coaxial coupler 40. Phase locking is provided between the mode resonant frequencies and read-out voltage controlled oscillators that continually provide a signal representing the resonant frequency of the sensor cavity. In FIG. 2 direct phase detection is used to provide a base band signal representing the deviation of source frequency from resonance. A voltage controlled signal source is provided for each resonant mode to be monitored. This signal is provided to signal combiner 64 that adds the group of voltage controlled source signals and provides them to cavity 12. At the output port 42 of cavity 12, the signal is provided to filters 66a–66d which separate the individual mode signals and provide them to the appropriate phase detectors 62a–62d. With inputs that include a reference signal and the cavity output signal, each phase detector renders a baseband signal that locks the voltage controlled signal source for a specific mode to the cavity resonant frequency for that mode. DC amplifiers 68a–68d, typically feedback amplifiers, are used to add a bias voltage, modify gain characteristics, and invert the feedback signal. A portion of the voltage controlled synthesizer signal is continuously monitored by a frequency counter. The construction of source 22 is typically the same as source 20 as shown in FIG. 2.

Figure 3:
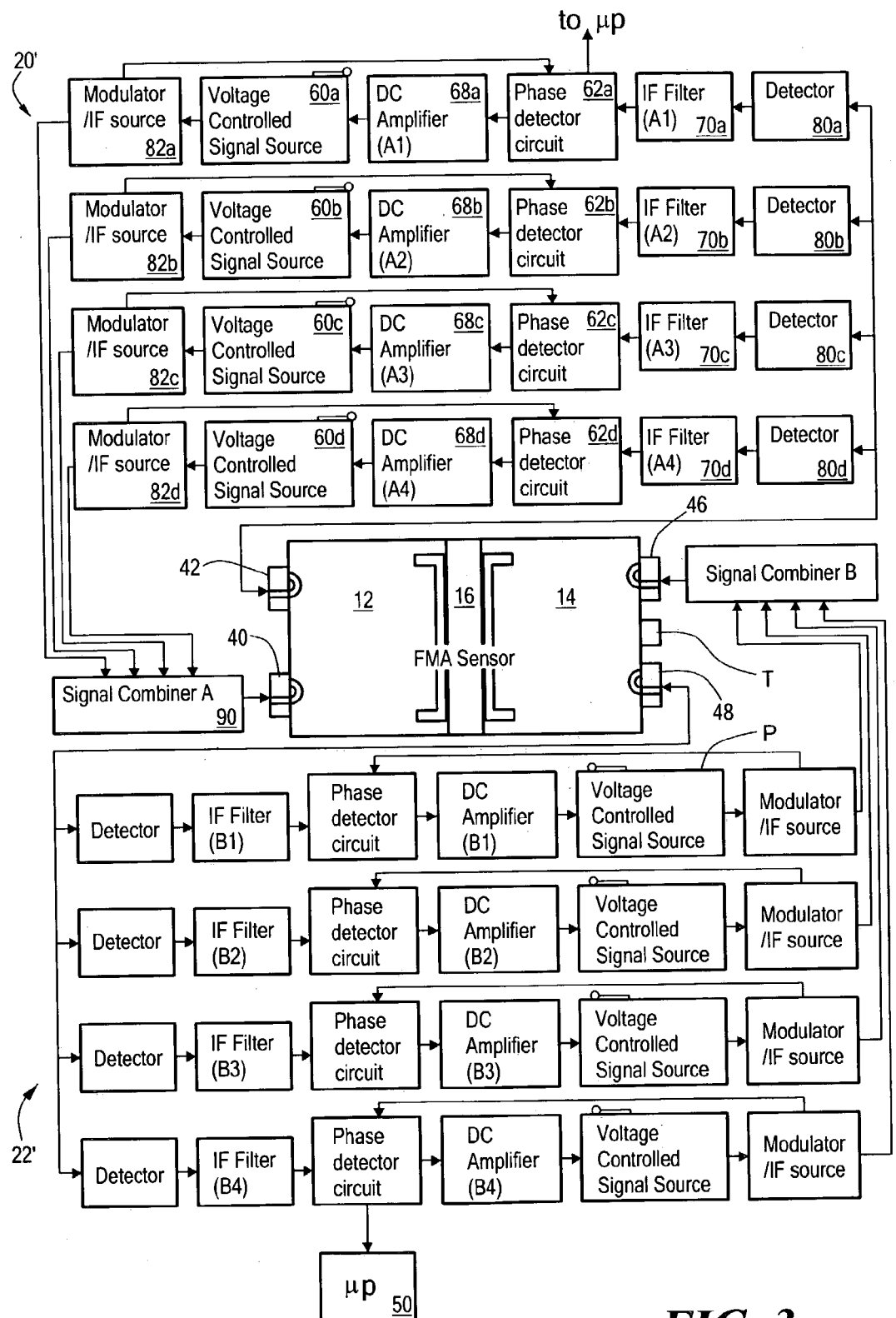
FIG. 3 is a block diagram showing the primary components associated with another embodiment of the two sources for introducing RF energy depicted in FIG. 1.

In another embodiment, intermediate frequency phase detection is used to provide a baseband signal representing the deviation of source frequency from resonance. Source 20', FIG. 3 provides a voltage controlled signal for each resonant mode to be monitored. This signal is phase modulated with an intermediate frequency signal and each mode is assigned a separate intermediate frequency by modulators 82a–82b. The modulated signals are provided to signal combiner 90 which adds the group of modulated voltage controlled source signals and provides them to sensor cavity 12. At the output port 42 of sensor cavity 12, the signal is provided to amplitude detectors 80a–80b. A set of intermediate frequency filters 70a–70d separate the individual mode signals and provides them to the appropriate phase detectors 62a–62b. The intermediate frequency modulating signal is also provided to the intermediate frequency phase detectors 70a–70d. The intermediate frequency phase detectors render baseband signals that lock the voltage controlled signal source for a specific mode to the cavity resonant frequency for that mode. DC amplifiers 68a–68d are used to add a bias voltage, modify gain characteristics, and invert the feedback signal. A portion of the voltage controlled synthesizer signal is continuously monitored by a frequency counter. Again, source 22' is typically constructed as source 20'.

In both embodiments, a two port sensor cavity may be used. Before the sensor input, the signals are applied to a signal combiner with a single coaxial output port. The signal from this output is applied to the sensor cavity input. At the output of the sensor cavity, the signal is distributed to a set of filters which separates the signals according to frequency. With this method, an arbitrary number modes can be excited within each cavity using the same port configuration. The sensor and source ports may also be combined, producing one port per cavity. Alternatively, multiple ports may be added to each cavity so the port locations can be optimized for each mode to be tracked.

And, both embodiments uniquely result in an acceleration determination based on at least four independent variables:

$$\hat{a}=f(\omega_{a1}, \omega_{a2}, \omega_{b1}, \omega_{b2}) \quad (1)$$

where (^) indicates an estimated quantity, ω is the measured cavity resonance, a and b are the subscripts referring to the specific cavity, and the numbers 1 and 2 are the numbers for the modes evaluated. In the specific example above, a is cavity 12, b is cavity 14. For the sake of explanation, only two modes are produced in each cavity for equation (1).

When only a single cavity is used, $$\hat{a}=f(\omega_{a1}, \omega_{a1}) \quad (2)$$

In either equation (1) or (2) above, the additional frequencies essentially account for thermal variations. With only one cavity, only the average temperature of that cavity is measured. With two cavities, as disclosed in the subject invention, however, average cavity temperatures are measured but, in addition, axial and gradient information is also obtained. The gradient information includes information relating to the temperature state of the cavity and proof mass subsystem materials that is more precise than that from a single cavity representation.

The programming associated with processor 50, FIG. 1 is typically based on the following analyses. In a cylindrical cavity, of radius R and height H, the natural resonant frequency when excited with either a $TE_{nmp}$ or $TM_{nmp}$ mode is, $$\omega_{nmp} = \frac{1}{\sqrt{\mu\varepsilon}} \sqrt{\frac{\chi_{nm}^2}{R^2} + \frac{\pi^2 p^2}{H^2}} \quad (3)$$

where the term, $1/\sqrt{\mu\varepsilon}$ is the propagation speed of the electromagnetic waves within the dielectric material of the cavity. The coefficient, $\chi_{nm}$, is the zero of a Bessel function for an excited TM mode, or the extreme of the Bessel function of a TE mode being excited. The constant "p" is the number of half wavelengths along the axis of the cavity. $TM_{p=0}$ and $TM_{p>0}$ are discussed above. R and H are the cavity's radius and height. n and m are mode shape designators which correspond to the different Bessel functions.

Equation (3) can be rewritten to express the radius and height as the sum of some arbitrary reference dimensions and an offset created by cavity deformations thus:

$$\omega_{nmp} = \frac{1}{\sqrt{\mu\varepsilon}} \sqrt{\frac{\chi_{nm}^2}{(R_0 + dr)^2} + \frac{\pi^2 p^2}{(H_0 + dh)^2}} \quad (4)$$

A Taylor series expansion to the first order can be used for an expression relating the change in frequency to a change in dimensions. Equation (5) is now rewritten in this form where all of the constants are combined to form a single linear expression:

$$\Delta\omega = K_I dr + K_H dh \quad (5)$$

The deformations can be separated and parameterized and related to a linear response to temperature input. Equations (6) and (7) characterize the physical response of a cavity to an input acceleration as well as three types of gradients (uniform, input axis (IA), and transverse) which can by superimposed to represent nearly any thermal profile the accelerometer is likely to see. The expressions for the components of deformation are, $$dr = K_1 dT + K_2 \nabla_{IA} + K_3 \nabla_t \quad (6)$$

$$dh = K_4 dT + K_5 \nabla_{IA} + K_6 \nabla_t + K_7 g \quad (7)$$

where dT is a uniform temperature change, $\nabla_{IA}$ is a gradient along the cylindrical input axis of the accelerometer, and $\nabla_t$ is a gradient in the radial (transverse) direction.

Temperature responses are generally small and therefore the first order terms are usually sufficient to represent the behavior. The accelerometer's response is designed to be extremely linear, though higher order effects can be integrated into the acceleration measurement when needed, as is done in other inertial instruments.

Equations (5) through (7) can then be combined to form an expression for the change in cavity frequency under the combined thermal and gravitational loading conditions thus:

$$\Delta\omega = K_A dT + K_B \nabla_{IA} + K_C \nabla_t + K_D g \quad (8)$$

From equation (8) it is evident that the change in frequency is a function of four unknown quantities (acceleration, uniform temperature change, IA gradient changes, and transverse gradient changes). Traditionally, the accuracy of the acceleration measurement would be reduced due to the contributions of the other unknowns. If four independent equations with these terms can be developed, the system of equations can be solved simultaneously allowing the acceleration measurement to be made by processor 50 independently of the other adverse effects.

For each mode measured in a cavity, the change in each frequency yields the solution to an independent equation. If two modes in each of cavities 12 and 14 are monitored in a nearly simultaneous manner, there are four independent equations that can be solved by processor 50 for the four variables.

This system of linear equations, is expressed in matrix form below where the change in frequency for each of two modes in two cavities is monitored. During calibration, known accelerations and thermal loading are applied in order to solve for the coefficients K in the compensation matrix:

$$\begin{bmatrix} K_{a1dT} & K_{a1\nabla_u} & K_{a1\nabla_t} & K_{a1g} \\ K_{a2dT} & K_{a2\nabla_u} & K_{a2\nabla_t} & K_{a2g} \\ K_{b1dT} & -K_{b1\nabla_u} & K_{b1\nabla_t} & -K_{b1g} \\ K_{b2dT} & -K_{b2\nabla_u} & K_{b2\nabla_t} & -K_{b2g} \end{bmatrix} \begin{bmatrix} dT \\ \nabla_{IA} \\ \nabla_t \\ g \end{bmatrix} = \begin{bmatrix} \Delta\omega_{a1} \\ \Delta\omega_{a2} \\ \Delta\omega_{b1} \\ \Delta\omega_{b2} \end{bmatrix} \text{ or} \quad (9)$$

$$[K][U] = [\Delta\Omega] \quad (10)$$

Equation (9) indicates that temperature and acceleration can be estimated from the measured cavity frequencies by:

$$[U] = [\hat{K}]^{-1}[\Delta\Omega] \quad (11)$$

where the carat (^) indicates a quantity stored in memory 51, FIG. 1. The compensation matrix also accounts for non-uniform behavior including manufacturing discrepancies which may introduce errors when a common mode error rejection method is employed.

The actual temperatures need not be solved and thus the linearized equation for estimating the specific acceleration force from the cavity frequencies is:

$$\hat{g} = \hat{S}_{a1}\Delta\omega_{a1} + \hat{S}_{a2}\Delta\omega_{a2} + \hat{S}_{b1}\Delta\omega_{b1} + \hat{S}_{b2}\Delta\omega_{b2} + S_D D \quad (12)$$

The compensation constants $\hat{S}$ are determined by subjecting the instrument to various thermal environments and specific forces. The compensation constants can then be determined by least squares, Kalman filtering, or other algorithms for determining the coefficients. D in the expression above is based on the output from sensor 60, FIG. 1 and also the output from sensor 62. Thus, sensors such as sensor 60 and sensor 62 and other sensors may provide additional output signals to processor 50. In one example, sensor 60 is a thermistor which senses the temperature T of cavity 14 and sensor 62 is able to sense the power consumption P or electronic drift of source 20. Thus, in addition to the compensation provided by the multiple modes in each cavity which account for changes in the microwave cavity sizes due to thermal variations, any error inducing effects from electronic drift due to temperature and/or other error sources can be compensated by interrogating the phase detector voltage at off resonant frequencies. Other external disturbances and parameters (system temperature, power consumption and the like) can also be measured and accounted for by including these terms in the compensation fit to further improve performance.

It generally occurs that compensation curves are not simply linear functions. Often series containing quadratic, cubic, and higher orders of temperature are used. For this reason, the general form of the compensation should follow Equation (1) with additional terms added as required.

Thus, accelerometer 10, FIG. 1 includes first microwave cavity 12, second microwave cavity 14, proof mass 16 between the cavities which, in response to acceleration, increases the length of one cavity while decreasing the length of the other cavity. Source 20 introduces RF energy into cavity 12 to produce at least first and second standing waves at first and second resonant frequencies at least one of which changes in frequency with changes in cavity length. Source 22 then produces first and second outputs indicative of any changes of the first and second frequencies $\Delta\omega_{a1}$ and $\Delta\omega_{a2}$. Source 22 introduces RF energy into the second cavity to produce third and fourth standing waves at third and fourth resonant frequencies at least one of which changes in frequency with changes in cavity length. Source 22 then produces third and fourth outputs indicative of any change in the third and fourth frequencies $\Delta\omega_{b1}$ and $\Delta\omega_{b2}$. Processor 50 determines acceleration g as a function of $\Delta\omega_{a1}$, $\Delta\omega_{a2}$, $\Delta\omega_{b1}$, and $\Delta\omega_{b2}$ pursuant to Equations (1) and (12) above.

Thus, the system and method of this invention compensate for gradients in dual cavity devices including but not limited to accelerometers wherein a first source (e.g., source 20, FIG. 1) drives a first cavity (e.g., cavity 12) at least two different modes, at least one mode varying with changes in cavity length. In other words, not every mode produced in cavity 12 is a $TM_{p=0}$ peak. A second source, for example source 22, drives a second cavity (e.g., cavity 14) also at least two different modes at least one mode varying with changes in cavity length. Processor 50 is configured (e.g., programmed) to determine changes in cavity length as a function of both modes in both cavities to compensate for non-uniform behavior between the cavities as discussed above with reference to Equations (1) and (3)–(12). In general terms, the change in the length of cavity a produces a frequency change at a first mode of $\Delta\omega_{a1}$ and the change in the length that same cavity also produces a frequency change at a second mode of $\Delta\omega_{a2}$, The change in the length of cavity b produces a frequency change at a first mode of $\Delta\omega_{b1}$, and the change in the length that same cavity produces a frequency change at a second mode of $\Delta\omega_{b2}$. Processor 50 calculates acceleration by solving the Equation (12) above wherein $\hat{g} = \hat{S}_{a1}\Delta\omega_{a1} + \hat{S}_{a2}\Delta\omega_{a2} + \hat{S}_{b1}\Delta\omega_{b1} + \hat{S}_{b2}\Delta\omega_{b2} + S_D D$ where $\hat{S}_{a1}$, $\hat{S}_{a2}$, $\hat{S}_{b1}$, and $\hat{S}_{b2}$, and $S_D$ are constants stored in memory 51 which may be separate from processor 50 or an integral part of processor 50.

Sensor 60, if employed, is responsive to cavity a and/or cavity b and has an output. Thus, processor 50 determines changes in cavity length as a function of both modes in both cavities and also as a function of the output of sensor 60 as shown in Equation (12). Sensor 62 is responsive to one or both sources and also produces an output. Processor 50 then determines changes in cavity length as a function of both modes in both cavities and also as a function of the output of sensor 62.

Alternatively, each cavity's incremental length and radius may be determined from two frequencies and the eigenfrequency equation (3) or (4). The solution of the two simultaneous nonlinear equations can be done in closed form since the equations are linear in $1/R^2$ and $1/H^2$. The acceleration is then estimated as a nonlinear function of the incremental lengths and radii. The benefit is the severe nonlinearity in the frequency versus cavity length is handled directly so that high order terms in acceleration are not required. Thus, acceleration can be estimated as a linear combination of the four frequencies, pressure, temperature, and, if needed, other measured quantities.

The result is a system for compensating for gradients in any dual cavity device resulting in highly accurate inertial instruments and other devices requiring precise measurement of displacement or frequency.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An accelerometer comprising:
    a first microwave cavity;
    a second microwave cavity;
    a proof mass disposed between the cavities which, in response to acceleration, increases the length of one cavity while decreasing the length of the other cavity;
    a first source for introducing RF energy into the first cavity to produce at least first and second standing waves at first and second resonant frequencies, at least one of the first and the second resonant frequencies changing in frequency with changes in cavity length, said first source producing first and second outputs indicative of the first and second frequencies;
    a second source for introducing RF energy into the second cavity to produce at least third and fourth standing waves at third and fourth resonant frequencies, at least one of the third and the fourth resonant frequencies changing in frequency with changes in cavity length, said second source producing third and fourth outputs indicative of the third and fourth frequencies; and
    means, responsive to said first, second, third, and fourth outputs for determining acceleration as a function of any change in the first, second, third, and fourth frequencies to compensate for non-uniform behavior between the first and the second microwave cavities.

2. The accelerometer of claim 1 in which the first and second sources are coupled to the first and second microwave cavities by coaxial couplers.

3. The accelerometer of claim 1 further including a first sensor responsive to one of the first and the second microwave cavities and providing an output to said means, said means further configured to determine acceleration also as a function of said output.

4. The accelerometer of claim 3 further including a second sensor responsive to one of the first and the second sources and providing an output to said means, said means further configured to determine acceleration also as a function of said output.

5. The accelerometer of claim 1 further including a first sensor responsive to one of the first and the second microwave cavities and providing a first output to said means, a second sensor responsive to one of the first and the second sources and providing a second output to said means, said means further configured to determine acceleration also as a function of said first and second outputs of said first and second sensors.

6. The accelerometer of claim 1 in which each source includes a voltage controlled signal source for each resonant frequency and a phase detector circuit for each frequency to lock a respective voltage controlled signal source and to produce said outputs to the means for determining acceleration.

7. The accelerometer of claim 6 in which each first and second source further includes a signal combiner responsive to all of the voltage controlled signal sources for adding signals of each said first and second source and providing said signals to one of said cavities.

8. The accelerometer of claim 6 in which each first and second source further includes an amplifier connected between each phase detector circuit and each voltage controlled signal source.

9. The accelerometer of claim 6 in which each first and second source further includes a filter disposed between each phase detector circuit and one of said cavities for separating the frequencies.

10. The accelerometer of claim 6 in which each first and second source further includes a modulator responsive to each voltage controlled signal source to phase modulate a signal produced by each voltage controlled signal source.

11. The accelerometer of claim 10 in which each first and second source further includes an amplitude detector disposed between each phase detector circuit and one of said cavities.

12. The accelerometer of claim 11 in which each first and second source further includes an intermediate frequency filter disposed between each amplitude detector and each phase detector circuit.

13. A system for compensating for gradients in a dual cavity device, the system comprising:
    a first source for driving a first cavity in at least two different modes, at least one mode varying with changes in cavity length;
    a second source for driving a second cavity in at least two different modes, at least one mode varying with changes in cavity length; and
    means for determining changes in cavity length as a function of both modes in both cavities to compensate for non-uniform behavior between the cavities.

14. The apparatus of claim 13 in which the change in the first cavity length produces a frequency change at a first mode $\Delta\omega_{a1}$, the change in the first cavity length produces a frequency change at a second mode $\Delta\omega_{a2}$, the change in the second cavity length produces a frequency change at a first mode $\Delta\omega_{b1}$, and the change in the second cavity length produces a frequency change at a second mode $\Delta\omega_{b2}$.

15. The apparatus of claim 14 in which the means calculates acceleration $\hat{g}=\hat{S}_{a1}\Delta\omega_{a1}+\hat{S}_{a2}\Delta\omega_{a2}+\hat{S}_{b1}\Delta\omega_{b1}+\hat{S}_{b2}\Delta\omega_{b2}$, where $\hat{S}_{a1}$, $\hat{S}_{a2}$, $\hat{S}_{b1}$, and $\hat{S}_{b2}$ are constants.

16. The apparatus of claim 15 further including at least one sensor responsive to at least one of said first and second cavities and having an output and said means calculates acceleration $\hat{g}=\hat{S}_{a1}\Delta\omega_{a1}+\hat{S}_{a2}\Delta\omega_{a2}+\hat{S}_{b1}\Delta\omega_{b1}+\hat{S}_{b2}\Delta\omega_{b2}+S_D D$, where $S_D$ is a constant and D is based on the output of the at least one sensor.

17. The apparatus of claim 15 further including at least one sensor responsive to at least one of said first and second sources and having an output and said means calculates acceleration $\hat{g}=\hat{S}_{a1}\Delta\omega_{a1}+\hat{S}_{a2}\Delta\omega_{a2}+\hat{S}_{b1}\Delta\omega_{b1}+\hat{S}_{b2}\Delta\omega_{b2}+S_D D$, where $S_D$ is a constant and D is based on the output of the at least one sensor.

18. The apparatus of claim 13 further including at least a first sensor responsive to at least one of said first and second cavities and having a first output and a second sensor responsive to at least one of said first and second sources and having a second output and said means determines changes in cavity length as a function of both modes in both cavities and the first and second outputs.

19. The apparatus of claim 13 in which the cavities are microwave cavities and include a proof mass therebetween and the means for determining includes a processor configured to calculate acceleration.

20. An accelerometer comprising:
a first microwave cavity;
a second microwave cavity;
a proof mass between the cavities which, in response to acceleration, increases the length of one cavity while decreasing the length of the other cavity;
a first source for introducing RF energy into the first cavity to produce at least first and second standing waves at first and second resonant frequencies $\omega_{a1}$ and $\omega_{a2}$, at least one of the first and the second resonant frequencies changing in frequency with changes in cavity length, said first source producing first and second outputs indicative of any changes of the first and second frequencies $\Delta\omega_{a1}$ and $\Delta\omega_{a2}$;
a second source for introducing RF energy into the second cavity to produce third and fourth standing waves at third and fourth resonant frequencies $\omega_{b1}$ and $\omega_{b2}$, at least one of the third and the fourth resonant frequencies changing in frequency with changes in cavity length, said second source producing third and fourth outputs indicative of any change in the third and fourth frequencies $\Delta\omega_{b1}$ and $\Delta\omega_{b2}$; and
means for determining acceleration g as a function of $\Delta\omega_{a1}$, $\Delta\omega_{a2}$, $\Delta\omega_{b1}$, and $\Delta\omega_{b2}$.

21. A method of determining acceleration in an accelerometer with a first microwave cavity, a second microwave cavity, and a proof mass between the cavities which increases the length of one cavity while decreasing the length of the other cavity in response to acceleration, the method comprising;
introducing RF energy into the first cavity to produce at least first and second standing waves at first and second resonant frequencies, at least one of the first and the second resonant frequencies changing in frequency with changes in cavity length;
introducing RF energy into the second cavity to produce at least third and fourth standing waves at third and fourth resonant frequencies, at least one of the third and the fourth resonant frequencies changing in frequency with changes in cavity length; and
determining acceleration as a function of any change in the first, second, third, and fourth frequencies to compensate for non-uniform behavior between the first and the second microwave cavities.

22. A method for compensating for gradients in a dual cavity device, the method comprising:
driving one cavity at least two different modes, at least one mode varying with changes in cavity length;
driving the other cavity at least two different modes, at least one mode varying with changes in cavity length; and
determining changes in cavity length as a function of both modes in both cavities to compensate for non-uniform behavior between the cavities.

23. A system comprising:
a first microwave cavity;
a second microwave cavity;
structure disposed between the cavities which increases the length of one cavity while decreasing the length of the other cavity;
at least first and second standing waves at first and second resonant frequencies, in the first cavity at least one of the first and the second resonant frequencies changing in frequency with changes in cavity length;
at least third and fourth standing waves at third and fourth resonant frequencies, in the second cavity at least one of the third and the fourth resonant frequencies changing in frequency with changes in cavity length; and
means for calculating any change in the first, second, third, and fourth frequencies to compensate for non-uniform behavior between the first and the second cavities.

* * * * *